United States Patent [19]
Young

[11] 3,875,551
[45] Apr. 1, 1975

[54] RUNWAY APPROACH RADAR REFLECTORS

[76] Inventor: David M. Young, 627 N. Beachwood Dr., Burbank, Calif. 91506

[22] Filed: Aug. 2, 1973

[21] Appl. No.: 385,087

[52] U.S. Cl. ............................ 343/5 LS, 343/18 B
[51] Int. Cl. ........................................... H01q 15/14
[58] Field of Search......................... 343/5 LS, 18 B

[56] References Cited
UNITED STATES PATENTS

| | | | |
|---|---|---|---|
| 3,671,963 | 6/1972 | Assouline et al. | 343/5 LS |
| 3,680,111 | 7/1972 | Killon et al. | 343/5 LS |
| 3,775,766 | 11/1973 | Gendreu et al. | 343/5 LS |
| 3,787,841 | 1/1974 | Buehler et al. | 343/5 LS |

FOREIGN PATENTS OR APPLICATIONS

| | | | |
|---|---|---|---|
| 1,225,770 | 3/1971 | United Kingdom | 343/5 LS |

*Primary Examiner*—Maynard R. Wilbur
*Assistant Examiner*—G. E. Montone
*Attorney, Agent, or Firm*—Pastoriza & Kelly

[57] ABSTRACT

An airport runway radar reflector system cooperates with a rapid scanning self contained radar in an approaching aircraft in a manner to simulate a large mirror placed in front of the aircraft normal to the glide slope line. The radar reflectors take the form of a plurality of uniformly spaced parallel rectilinear strip members extending transversely across the airport runway normal to the longitudinal center line of the runway. Each of the strip members has a reflecting surface tilted at an angle corresponding to the glide slope of the approaching aircraft. The reflected radar signal received on the display screen in the aircraft will move on the display with movements of the aircraft in elevation and azimuth in the same manner as a reflected image of the aircraft would move if the referred to large mirror were positioned in front of the aircraft normal to the glide slope line.

A pilot can thus easily recognize the position of the aircraft relative to the runway viewed on the display screen.

2 Claims, 5 Drawing Figures

RUNWAY APPROACH RADAR REFLECTORS

This invention relates generally to radar landing systems for aircraft and more particularly to improved radar reflectors cooperating with a rapid scanning radar on an aircraft to aid the pilot in approach and landing of the aircarft.

BACKGROUND OF THE INVENTION

Radar reflectors such as corner reflectors in airport complexes are well known in the art and provide readily recognizable targets to aid a pilot in approach and landing operations. Since the introduction of perspective radar such as shown and described in my co-pending patent appliction Ser. No. 847,121 filed Aug. 4, 1969 and entitled AIRCRAFT CONTAINED PERSPECTIVE RADAR/DISPLAY AND GUIDANCE FOR APPROACH AND LANDING now U.S. Pat. No. 3,778,821 issued Dec. 11, 1973 greatly improved precision in landing operations as well as safety is realizable. In fact, such ground radar reflectors are extremely useful in a perspective radar display in aiding a pilot in recognizing the runway position.

Most airports include considerable industrial congestion such as buildings, freeway intersections, and the like and these objects provide good radar targets for return signals. Thus in using a perspective radar in locating a runway within an airport complex, it is usually the ability to recognize surrounding terrain, buildings, and the like which outline the runway rather than the runway itself. In fact, the runway itself normally appears as a black area on the perspective radar screen.

In my co-pending application Ser. No. 385,534 filed Aug. 3, 1974 entitled PERSPECTIVE RADAR AIRPORT RECOGNITION AND LANDING GUIDANCE SYSTEM there are disclosed various techniques for super-imposing an additional display on the perspective radar screen which will aid the pilot in recognizing the location of the airport runway in a perspective radar display. The advantage of the techniques disclosed is that all may be wholly self-contained within the aircraft and do not require any ground based equipment such as grounded radar reflectors and the like. On the other hand, by providing specially designed radar reflectors in the airport complex, the recognition and location of an airport runway as well as proper guidance of the aircraft onto the runway using perspective radar could be even further improved.

BRIEF DESCRIPTION OF THE PRESENT INVENTION

With the foregoing in mind, the present invention contemplates provision in an airport complex of specially designed radar reflectors which greatly enhance the use of a self-contained perspective radar in an approaching aircraft for effecting a precision approach and landing.

Essentially, the radar reflector system contemplates the provision of an elongated rectilinear strip member having a radar reflecting surface extending parallel to the runway threshold. The plane of the reflecting surface is tilted at an angle corresponding to a contemplated glide slope angle of an approaching aircraft. The length of the strip is at least equal to the width of the runway and preferably extends beyond the edges of the runway. With this arrangement, a reflected radar signal received on the aircraft radar display screen will move on the display screen horizontally on either side of the longitudinal center line of the airport runway distances indicated on the radar screen which corresponds precisely to the actual physical distances the aircraft moves to either side of the longitudinal center line. The pilot can thus observe his position in azimuth relative to the runway very easily.

In accord with a more sophisticated embodiment of the radar reflector system, a plurality of additional uniformally spaced parallel rectilinear strip members extend transversely across the airport runway over a major portion of the length of the runway surface. Each strip has a radar reflecting surface tilted at the contemplated glide slope of an approaching aircraft.

When reflected radar signals are observed on the perspective radar display in the aircraft, the signal appears as a bright glow which indicates the position of the aircraft both in azimuth and in elevation relative to the runway. In essence, the reflectors function in the same manner as a large mirror would function placed in front of the aircraft normal to the glide slope wherein the image of the aircraft in the mirror would move in the same manner as the reflected radar signal moves on the perspective display.

BRIEF DESCRIPTION OF THE DRAWINGS

A better understanding of the invention will be had by now referring to the accompanying drawings in which.

DETAILED DESCRIPTION OF THE INVENTION

Figure 1:
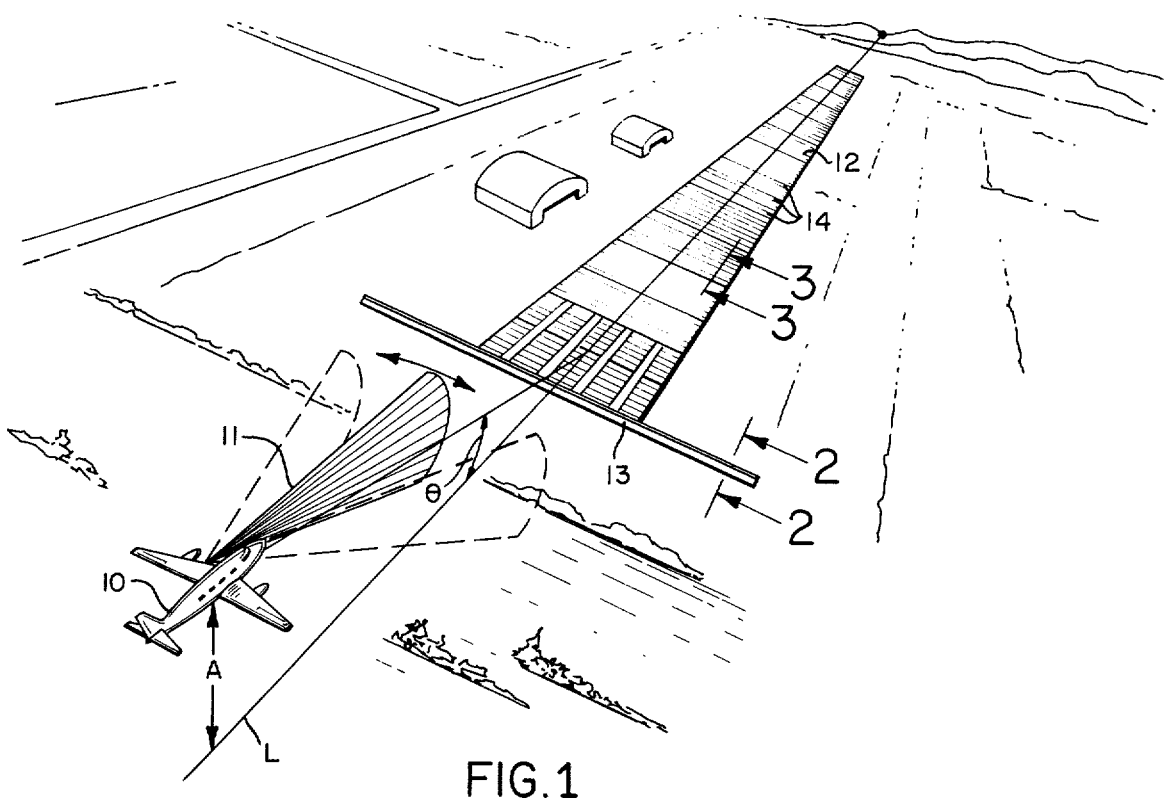
FIG. 1 is a perspective view of an airport complex wherein the radar reflectors of the present invention have been incorporated in the runway for cooperation with a perspective radar system on an approaching aircraft.

Referring first to FIG. 1 there is shown an aircraft 10 provided with a self contained rapid scanning radar of given wave length such as a perspective radar system described in my heretofore referred to co-pending patent applications. This perspective radar generates a fan shaped beam 11 which is scanned in azimuth as indicated by the dashed lines.

In FIG. 1, there is illustrated an airport runway 12 equipped with radar reflectors in accord with the present invention.

In a simplified embodiment of the present invention, the radar reflector system constitutes the provision of a single elongated rectilinear strip member 13 extending parallel to the runway threshold and preferably beyond the threshold corners as shown. The strip 13 may be located precisely at the threshold or slightly in front of the threshold.

In a more comprehensive reflector system, the runway 12 may also be provided with additional uniformly spaced parallel rectilinear strip members 14 extending transversely across the airport runway over a major portion of the length of the runway surface.

In FIG. 1, the longitudinal center line of the runway is indicated at L, the altitude of the aircraft by the letter A and the angle of the glide slope by $\theta$.

Figure 2:
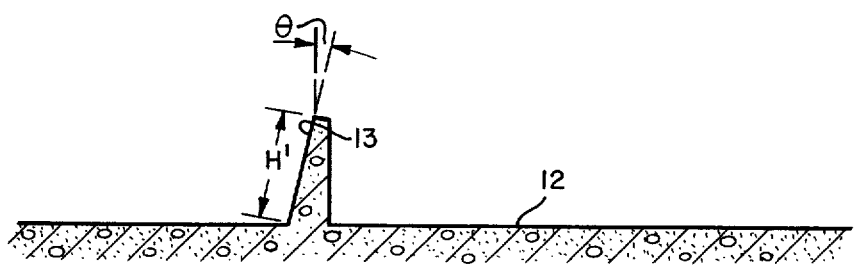
FIG. 2 is an enlarged fragmentary cross section of one of the reflectors taken in the direction of the arrows 2—2 of FIG. 1.

Referring now to FIG. 2, it will be noted that the elongated strip member 13 may constitute concrete or any other suitable material which provides for reasonably good reflection of a radar signal. The strip is provided with a reflecting surface extending parallel to the runway threshold the plane of the reflecting surface being tilted at an angle $\theta$ corresponding to the contemplated glide slope angle of the approaching aircraft 10 of FIG. 1.

Considering the operation of the elongated strip reflector 13 by itself, the situation is analogous to light being reflected from a long rectilinear railroad track wherein if one observes the reflected light, it will appear as a bright spot and move along the track with movement of the viewer in a direction parallel to the track.

This same situation obtains when the perspective radar screen in the aircraft is viewed by the pilot, the reflected radar signal received on the aircraft radar display moving on the display horizontally on either side of the longitudinal center line L with movements of the aircraft itself to either side of this longitudinal center line. The pilot can then recognize immediately any deviation in azimuth of the aircraft from the longitudinal center line L by simply observing the position of the received signal.

A positional reference in elevation is provided by the additional elongated strip members 14 described in FIG. 1 along the length of the runway.

Figure 3:
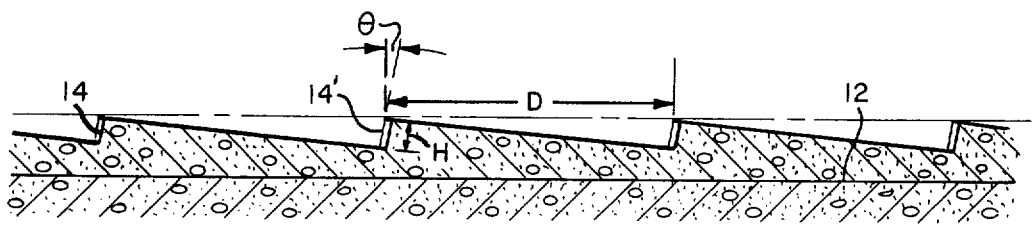
FIG. 3 is another fragmentary cross section of further radar reflectors taken in the direction of the arrows 3—3 of FIG. 1.

With specific reference to FIG. 3, these elongated strip members may be formed directly in the concrete of the runway by scoring the runway transversely. A conductive surface which is highly reflective to radar may be disposed on the strip portions facing the approaching aircraft as indicated at 14' in FIG. 3.

As in the case of the reflector described in FIG. 2, the reflecting surfaces of each of the strips 14 is tilted at an angle corresponding to the glide slope of the approaching aircraft. Further, if the heighth of each reflecting surface is designated H and the horizontal distance between the various strips is designated D then the ratio of H/D is made to correspond to the sine of the glide slope angle $\theta$. Moreover, the distance D times the cosine of the glide slope angle $\theta$ is made an integral multiple of the given wave length of the radar. Reflections from the respective strip surfaces are thus maintained in phase in the direction of the approaching aircraft.

Figure 4:
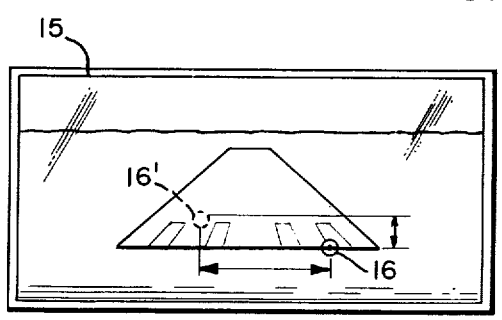
FIG. 4 illustrates a perspective radar display as viewed by a pilot in the aircraft of FIG. 1.

Referring now to FIG. 4, there is shown a radar display screen 15 upon which a perspective view of the runway is produced by the perspective radar. Because of the highly reflective nature of the elongated strips, there will be provided a bright glow such as indicated at 16 as a consequence of the reflected radar signal from, for example, the strip reflector 13 at the runway threshold. As described, this reflected signal or bright glow 16 will move horizontally back and forth with shifts in the position of the aircraft in horizontal directions on either side of the longitudinal center line of the airport. When only the strip reflector 13 it self is used, it would preferably have a heighth H' substantially greater than the heighth H of the strips 14 so that a reflected signal would be received even though the elevation of the aircraft changes. For example, the height of the strip 13 at the threshold of the runway would approach that of the runway lights.

However, in the event that the additional strips are provided as at 14, the threshold strip 13 would preferably have a small height corresponding to the heighth H of the other strips 14 and would be spaced from the beginning of the other strips 14 by the same distance D.

Where all of the various strips are utilized, the reflected energy pulse would appear on the screen 15 on FIG. 4 in an azimuth or horizontal position to the right or left of the longitudinal center line of the airport depending upon the actual physical distance the aircraft is positioned to the right or left of this horizontal line and also in an elevated position corresponding to the elevation of the aircraft above or below its selected glide path. Thus, for example, in FIG. 4 the glowing target point 16 may assume a position such as indicated at 16' indicating to the pilot that his elevation is above the desired glide path which desired glide path would intercept the threshold of the runway.

The situation shown in FIG. 4 is the same as though a large semi-transparent mirror was positioned in front of the aircraft normal to the glide slope line so that the pilot would see a reflected image of the aircraft and also be able to view the outline of the runway through the mirror. The reflected image of the aircraft would assume a positioning corresponding to that of the signal 16 or 16' in FIG. 4 depending upon the position of the aircraft. Thus if the aircraft moved to the left or right or up or down, the image or target signal would move in a corresponding manner.

Figure 5:
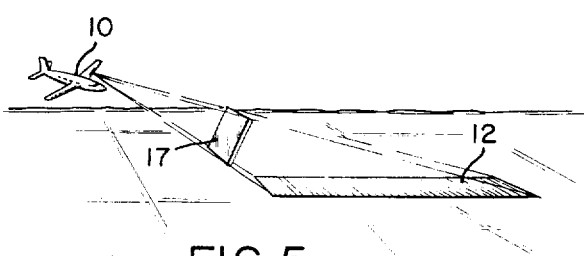
FIG. 5 illustrates the manner in which the radar reflectors simulate the existence of a large mirror in front of the aircraft.

Such a mirror as illustrated at 17 in FIG. 5 is defined by projecting the respective reflecting surfaces of the elongated strips in a forward direction so that they all line up in a plane normal to the glide slope. Since the slant spacing of the strips themselves are an integral multiple of a wave length apart as mentioned heretofore, the returning energy will all be in phase.

As a specific example of the construction of the radar reflector strips, if a glide path of 2.86 degrees is assumed, the height H might be 0.3125 inch and the distance D between adjacent strips times the cosine of 2.86 would be 6.25 inches. For an operating radar wave length of 1.25 inches, the slant spacing between adjacent strips corresponding to D cos 2.86 would thus be 5 wave lengths and the height would be one-fourth wave length.

Considering first the azimuth reflections as from the threshold strip 13, the size of the glow is a function of range to the reflector and may be computed based on the Fraunhofer range (page 490 International Dictionary of Physics and Electronics, Van Nostrand 1961) criteria for the far field and the plane wave where the edges of the glow have a 22.5 degree phase lag. At one-fourth the range the same edge glow dimension will have a 90° phase front error, that is less glow. The range from the reflector to the aircraft is equal to $2S^2/\tau$ is the azimuth glow size or distance along the transverse strip over which reflected energy is uniformly returned to the aircraft and $\tau$ is the operating wave length. To illustrate the azimuth glow size to provide the signal 16 of FIG. 4, let the wave length be 1.25 inches, range from the reflector to the aircraft 4,000 feet, glideslope 2.86 degrees and altitude 200 feet. The distance S is then about 14 feet; that is, energy received and reflected over a 14 foot distance on the strip from left to right, which is approximately one-tenth of the standard runway width of 150 feet, is returned to the aircraft and energy received and reflected beyond the 14 feet is reflected much away from the aircraft.

The azimuth glow of distance S is proportional to the square root of the range from the reflector to the aircraft as is evident from the previous formula. Thus, for the same glide slope and wave length, if the range is 16,000 feet instead of 4,000, the azimuth glow would be about 28', twice the previous example. If the aircraft moves off the center line 24 feet, as an example, the glow area will also move exactly 24 feet. Aircraft displacement off the center line is thus directly equal to the movement laterally of the reflective glow along the reflecting strip on the ground.

Considering now the elevation reflections as from the array of strips 14, the elevational displacement is computed exactly as above with the exception that the dimensions are simply multiplied by 20/1 for a glide slope of 2.86°. Thus in the first example for an azimuth glow 14 feet wide, such glow in elevation would be 20/1 × 15' = 280 feet along the runway length. An elevation or altitude displacement of, for example, 24 feet by the aircraft would show a 20.1 × 24 foot displacement along the runway; that is, 480 feet. However, on the perspective radar, it is very significant that the vertical displacement, for example the position of the signal 16' in FIG. 4, appears as exactly a 24 foot change in elevation. This change is independent of the range of the aircraft.

It should be noted that the above relationships are independent of pitch and yaw of the aircraft as well as of the radar pulse width, except that some reasonable pulse width is required to maintain sufficient resolution so that movement of the glow can be observed relative to the runway or the portion of the airport complex shown on the display.

It should also be understood that while the invention has been described with respect to perspective radar on the aircraft, any high resolution scanning type radar on the aircraft could be used; for example, PPI (plan position indicator) or helicopter rotor blade radar in a plan position indicator perspective format.

Finally, while the reflectors have been described as formed in the runway as by scoring the concrete, the strips could be provided in the form of a blanket or mat encased in plastic to provide a smooth top surface as indicated by the long and short dashed line in FIG. 3. Moreover, these elevation reflection strips could be located on either side, or one side of the runway if it should be objectionable to position or form them directly on the runway. In positioning the successive strips along one or both sides of the runway, the pilot would rely on the basic threshold strip 13 of FIG. 1 for azimuth information and on the succession of strips along the side or sides of the runway for elevational information. Since only elevational information is required of these latter strips, they could be relatively short in transverse length but of course would be designed to provide a reflection for any azimuth position of the aircraft, the precise azimuth location being provided by the threshold strip. There would then appear two glow signals on the display screen, one representing azimuth position along the threshold line and the other representing elevational positions along the side of the runway.

What is claimed is:

1. A radar reflector system for guiding an aircraft onto a runway in an airport complex, comprising, in combination:

a. a radar system operating at a given wavelength generating a fan-shaped beam in a vertical plane which is rapidly scanned in azimuth to provide a perspective image of the airport complex on a display screen, said radar system and display screen being wholly self-contained in said aircraft; and b. a passive radar reflector means including a plurality of reflector members uniformly spaced along a path parallel to the length of the runway surface, each reflector member having a given height H, the separation distance between adjacent members in the direction of the length of the runway along said path being a given distance D, and wherein for a desired given glide slope angle, the ratio H/D equals the sine of the glide slope angle and D times the cosine of the glide slope angle is an integral multiple of said given wavelength, whereby a reflected radar signal from the member displayed as a glow on the display screen in the aircraft approaching at said given glide slope angle will move in elevation as seen on the display screen with respect to the airport complex through distances indicated on the display screen corresponding to the actual elevational movements of the aircraft independent of pitch and yaw, the movement of the reflected signal glow in elevation being equivalent to the movement of a reflected image of the aircraft in a large mirror in front of the aircraft normal to the glide slope line of the aircraft.

2. A system according to claim 1, in which each of the members extends transversely across the longitudinal center line of the runway and defines a substantially flat reflecting surface tilted upwardly at said given glide slope angle whereby said reflected radar signal displayed as a glow on the display screen in the aircraft will move horizontally through distances indicated on the screen corresponding to the actual horizontal movements of the aircraft independent of pitch and yaw, the movement of the reflected signal glow in horizontal directions being equivalent to the horizontal movement of the reflected image in said large mirror so that both an elevational and azimuthal position of the aircraft relative to the airport runway and complex is provided by said glow.

* * * * *